United States Patent
Bauman et al.

(10) Patent No.: US 8,146,006 B2
(45) Date of Patent: Mar. 27, 2012

(54) METHOD AND APPARATUS FOR OBTAINING USER INTERFACE INFORMATION FROM EXECUTABLE PROGRAM CODE

(75) Inventors: Brian Daniel Bauman, Austin, TX (US); Amanda Jane Bauman, Austin, TX (US); Michael Pierre Carlson, Austin, TX (US); Jennifer A. Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 11/565,922

(22) Filed: Dec. 1, 2006

(65) Prior Publication Data

US 2008/0134062 A1    Jun. 5, 2008

(51) Int. Cl.
*G06F 3/00* (2006.01)
*G06F 3/048* (2006.01)
*G06F 9/44* (2006.01)

(52) U.S. Cl. ......... 715/762; 715/763; 715/700; 717/100

(58) Field of Classification Search .................. 715/762, 715/763, 700; 717/100

See application file for complete search history.

(56) References Cited

U.S. PATENT DOCUMENTS

| 5,335,342 | A  | * | 8/1994 | Pope et al. ...................... 714/38 |
| 5,745,738 | A  | * | 4/1998 | Ricard ............................ 703/13 |
| 7,490,319 | B2 | * | 2/2009 | Blackwell et al. ............ 717/124 |
| 2002/0118225 | A1 | * | 8/2002 | Miksovsky .................... 345/762 |
| 2004/0148591 | A1 | * | 7/2004 | Kumhyr et al. ............... 717/137 |
| 2006/0253739 | A1 | * | 11/2006 | Godefroid et al. ............. 714/38 |

OTHER PUBLICATIONS

"Graph Extractor Designed by VB6", Mar. 2001, China Academic Journal Electronic Publishing House, pp. 1-3.

* cited by examiner

*Primary Examiner* — Ting Lee
(74) *Attorney, Agent, or Firm* — Yee & Associates, P.C.; John D. Flynn

(57) ABSTRACT

A technique to facilitate the automatic obtaining or extraction of dialogs or screens such as a graphical user interface from executable program code and saving a snapshot of such dialogs or screens in a graphical format. The executable program code is scanned or searched for particular modules within such program code that are used to generate a user interface or dialogue. Each one of these identified GUI-accessible modules is then processed in order to generate, display, and capture their associated user interface(s) or dialogue(s). Any requisite user input or sample data that is required by these modules is automatically generated and provided to assist in the generation, display, and capture of the interfaces/dialogues.

5 Claims, 2 Drawing Sheets

METHOD AND APPARATUS FOR OBTAINING USER INTERFACE INFORMATION FROM EXECUTABLE PROGRAM CODE

BACKGROUND OF THE INVENTION

1. Field of the Invention

The present invention relates generally to a tool to assist in user interface processing, and in particular relates to a tool for obtaining user interface information such as a dialogue box or other type of graphical user interface (GUI) information from executable program code.

2. Description of the Related Art

When translating a software program into multiple languages, one problem with current technology is that in order to verify the translation, testers must install the translated software and go to each screen to verify that the contents were translated correctly and displayed appropriately. This is a time consuming, cumbersome, and expensive process.

Another problem that exists is that the current methods for translating such a software program are not fail-safe in displaying every possible screen. Unless specific instructions are given, a person/tester may not know how to navigate the user interface in order to access and capture every possible dialog. Even if those instructions were provided, there is no acknowledgement or confirmation that all possible screens have been accessed and captured.

Yet another problem pertains to translation verification testing (TVT) methods and associated labor-intensiveness, where a program is executed and a user interacting with the program manually captures and saves screen images in an appropriate format that can be used by TVT testers.

Therefore, it would be desirable to provide a computer implemented method, apparatus and computer usable program code that facilitates the automatic obtaining or extracting of dialogs and other screens from executable program code and saving a snapshot of such dialogues in a graphical format.

SUMMARY OF THE INVENTION

A computer implemented method, apparatus, and computer usable program code are provided to facilitate the automatic obtaining or extraction of dialogues or screens such as a graphical user interface from executable program code and saving a snapshot of such dialogues or screens in a graphical format. The executable program code is scanned or searched for particular modules within such program code that are used to generate a user interface or dialogue. Each one of these identified GUI-accessible modules is then processed in order to generate, display, and capture their associated user interface(s) or dialogue(s). Any requisite user input or sample data that is required by these modules is automatically generated and provided to assist in the generation, display, and capture of the interfaces/dialogues.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
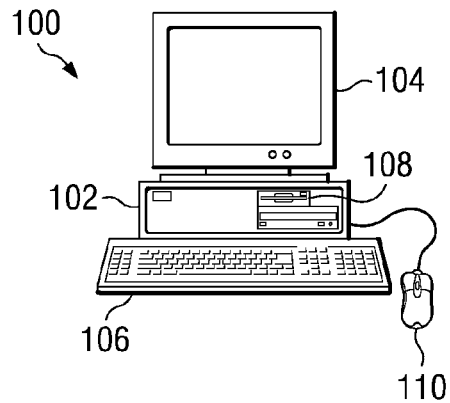
FIG. 1 is a pictorial representation of a data processing system in which the illustrative embodiments may be implemented.

With reference now to the figures and in particular with reference to FIG. 1, a pictorial representation of a data processing system is shown in which the illustrative embodiments may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems, such as a network computer. Computer 100 also preferably includes a graphical user interface (GUI) that may be implemented by means of systems software residing in computer readable media in operation within computer 100.

Figure 2:
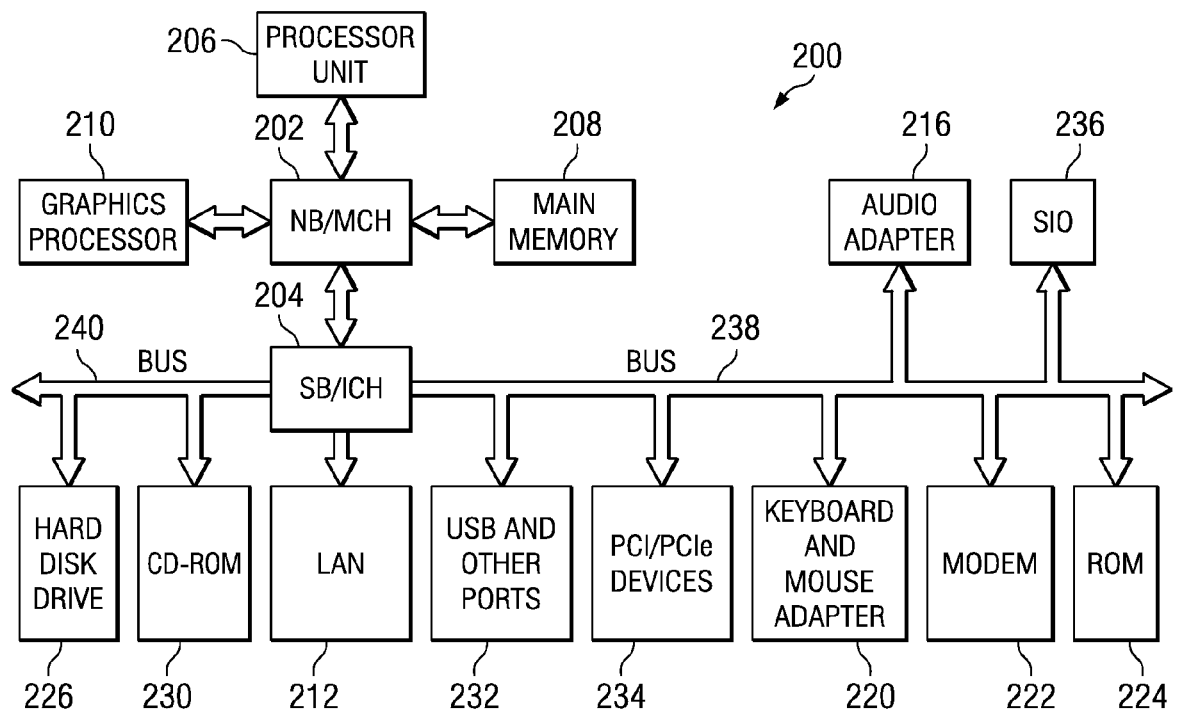
FIG. 2 is a block diagram of a data processing system in which the illustrative embodiments may be implemented.

With reference now to FIG. 2, a block diagram of a data processing system is shown in which the illustrative embodiments may be implemented. Data processing system 200 is an example of a computer, such as computer 100 in FIG. 1, in which code or instructions implementing the processes of the illustrative embodiments may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The description provided herein provides for a computer implemented method, apparatus, and computer usable program code for processing executable code. The methods of the illustrative embodiments may be performed in a data processing system, such as data processing system 100 shown in FIG. 1 or data processing system 200 shown in FIG. 2.

Figure 3:
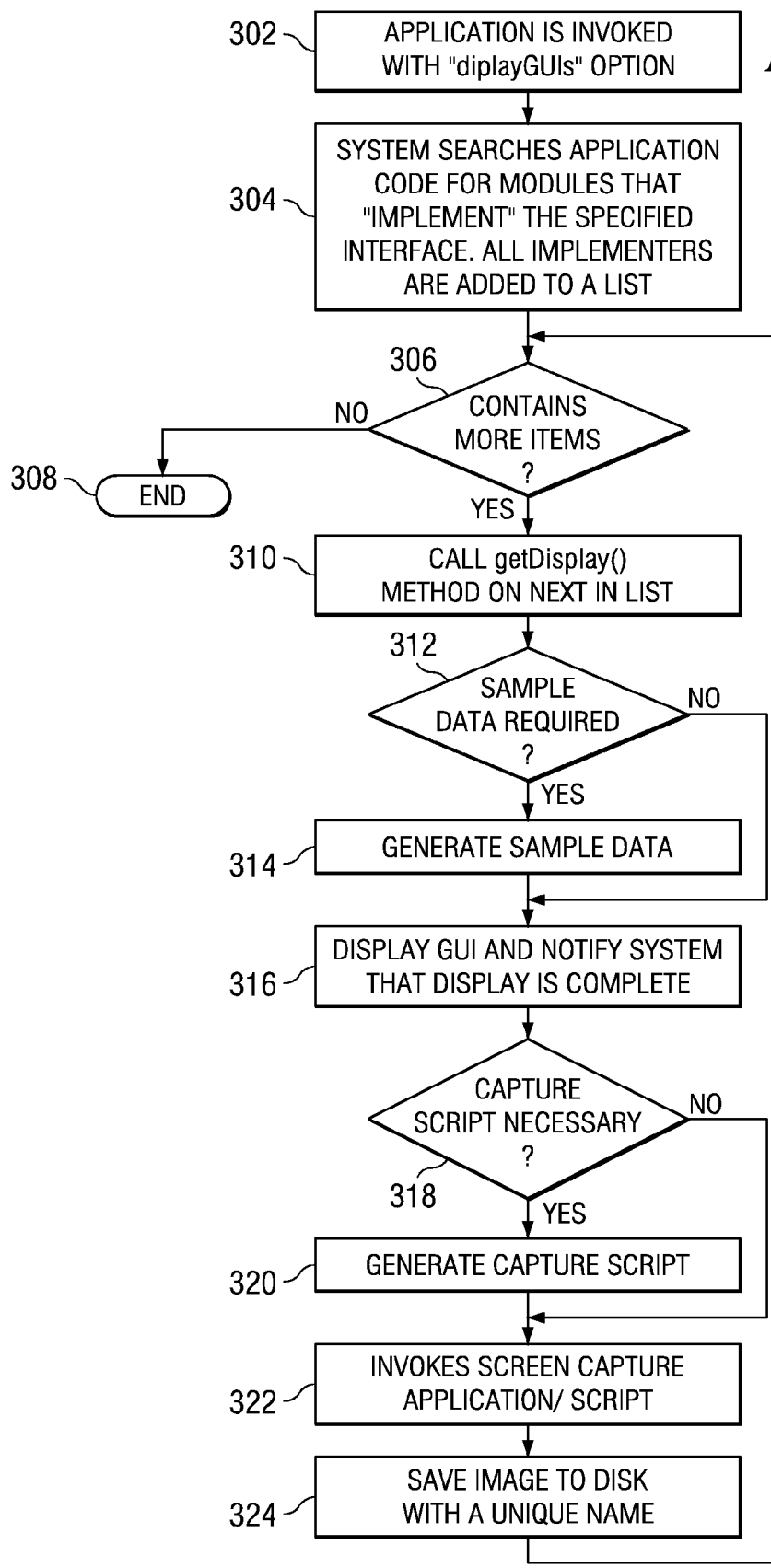
FIG. 3 is a processing flow-diagram for the automatic obtaining or extraction of dialogues from executable program code and saving a snapshot of such dialogues in a graphical format in accordance with the illustrative embodiments.

A computer implemented method, apparatus, and computer usable program code are provided to facilitate the automatic obtaining or extraction of dialogues from executable program code and saving a snapshot of such dialogues in a graphical format. A preferred processing flow is shown in FIG. 3. Processing begins at 302, where an executable program code such as an application program is invoked with a particular flag or indicator set to indicate that the program is invoked in a mode to display the GUIs or dialogues. At 304, the system searches this application or executable code for modules that implement a specified interface. For example, for Java executable code, all objects are analyzed to determine which ones implement a specified interface. This can be done using the Java method known as introspection. Each one of these GUI-accessible objects is then added to a list for further processing. At step 306, a determination is made as to whether the GUI-accessible object list contains any (more) items, and if not, processing ends at 308. If list items do exist, as determined at 306, a getDisplay( ) method is called at 310 in order to generate the user GUI or dialogue on a display of the device. A determination is made at 312 whether sample data is required to be input to the object currently being processed, and if so, such sample data is generated at 314. The class (or super class) on which the getDisplay( ) method is called provides the sample data for the screen shot during the processing of the getDisplay( ) method. This sample data is provided via the developer of the user interface. Such developer provides sample input data for each field in the user interface panel in the form of a method, such as getSampleDataGUI1( ), which is invoked to retrieve the sample input data for a given GUI-accessible object. This method for retrieving sample input data is associated with its GUI-accessible object by way of filename (e.g. same file name but different file type) or a linking reference. If no sample data is required, as determined at 312, or after the required sample data has been generated, as per step 314, the GUI or user dialogue is presented on the display of the device (which in an illustrative embodiment is being tested to ensure compliance with proper language translation) at 316. In addition, the system is notified that such display has been completed. A determination is then made at 318 as to whether a customized capture script or template is necessary to capture the display image to a file. A customized script/template is generally required for complex screens having multiple windows, including both foreground and background windows. If a customized script/template is required to be used, as per step 318, by determining whether such script/template exists in the file system, such as the existence of a file named generateCaptureScriptGUI1( ), the capture script is generated at step 320. The capture script is generated dynamically using the sample data provided by the author of the GUI screen. This capture script is generated by extracting a script template from the GUI-accessible object that is provided by the author of the GUI screen and then updating such template with particular parameters associated with the current display, such as location, sizing, and any requisite timing delay associated with this particular GUI-accessible object. The script may invoke button actions, text input, etc. on the GUI. At the time that it is determined that sample data is needed, a small script runs to gather the sample data in the GUI's code, as previously described. This populates the capture script with the necessary information to populate the screens with data. The screen capture script is then invoked at 322, requesting to take a picture or screen capture of a specified region.

If a customized screen capture script is not needed, as determined by block 318, an existing screen capture application or script is used to invoke the screen capture at 322 (e.g. for a relatively simple GUI interface). The image of the screen capture is then saved at 324, and processing then continues at 306 to determine whether any more items are contained on the GUI-accessible object list for processing. If so, processing continues as described above regarding blocks 310-324, and if not, processing terminates at 308.

Thus, the illustrative embodiments as described above provides a technique for facilitating the automatic obtaining or extraction of dialogues from executable program code and saving a snapshot of such dialogues in a graphical format.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for extracting user interface information from machine executable code that is operable for presenting the user interface information on a display device, comprising steps of:
    invoking the machine executable code in a mode that renders the user interface information that is contained within the machine executable code to form invoked machine executable code;
    responsive to invoking the machine executable code, determining which pre-existing modules within the invoked machine executable code are usable for rendering the user interface information on a display of a device;
    using the pre-existing modules to render at least one user interface on the display of the device;
    extracting the user interface information from the invoked machine executable code that is operable for presenting the user interface information on the display device by capturing an image of the at least one user interface rendered on the display during the invoking of the machine executable code; and
    saving the captured image of the at least one user interface rendered on the display to a file;
    wherein the step of determining which pre-existing modules within the invoked machine executable code are usable for rendering the user interface information comprises:
    searching the invoked machine executable code to locate display modules contained within the invoked machine executable code; and
    responsive to searching the invoked machine executable code, adding the display modules that are located to a list.

2. The method of claim 1, wherein the step of using the pre-existing modules to render at least one user interface further comprises:
    invoking a given display module of the display modules that is on the list to render the at least one user interface.

3. A system for extracting user interface information from machine executable code that is operable for presenting the user interface information on a display device, comprising:
    a data processor, a computer readable memory and a computer readable storage media;
    first instructions for invoking the machine executable code in a mode that renders user interface information contained within the machine executable code to form invoked machine executable code;
    second instructions, responsive to the first instructions for invoking the machine executable code, for determining which pre-existing modules within the invoked machine executable code are usable for rendering the user interface information on a display of a device;
    third instructions for using the pre-existing modules to render at least one user interface on the display of the device;
    fourth instructions for extracting the user interface information from the invoked machine executable code that is operable for presenting the user interface information on the display device by capturing an image of the at least one user interface rendered on the display during the invoking of the machine executable code; and
    fifth instructions for saving the captured image of the display of the at least one user interface rendered on the display to a file; wherein the first, second, third and fourth instructions are stored on the computer readable storage media for execution by the data processor via the computer readable memory;
    wherein the second instructions for determining which pre-existing modules within the invoked machine executable code are usable for rendering the user interface information comprises instructions for searching the invoked machine executable code to locate display modules contained within the invoked machine executable code and adding the display modules that are located to a list, and wherein the third instructions for using the pre-existing modules to render at least one user interface further comprises invoking a given display module of the display modules that is on the list to render the at least one user interface.

4. A computer program product embodied in a tangible computer usable storage medium having computer usable program code for extracting user interface information from machine executable code that is operable for presenting the user interface information on a display device, said computer program product comprising:
- computer usable program code for invoking the machine executable code in a mode that renders user interface information contained within the machine executable code to form invoked machine executable code;
- computer usable program code, responsive to the computer usable program code for invoking the machine executable code, for determining which pre-existing modules within the invoked machine executable code are usable for rendering the user interface information on a display of a device;
- computer usable program code for using the pre-existing modules to render at least one user interface on the display of the device;
- computer usable program code for extracting the user interface information from the invoked machine executable code that is operable for presenting the user interface information on the display device by capturing an image of the at least one user interface rendered on the display during the invoking of the machine executable code; and
- computer usable program code for saving the captured image of the display of the at least one user interface rendered on the display to a file;
- wherein the computer usable program code for determining which pre-existing modules within the invoked machine executable code are usable for rendering the user interface information comprises:
- computer usable program code for searching the invoked machine executable code to locate display modules contained within the invoked machine executable code; and
- computer usable program code, responsive to the computer usable program code for searching the invoked machine executable code, for adding the display modules that are located to a list.

5. A computer program product embodied in a tangible computer usable storage medium having computer usable program code for extracting user interface information from machine executable code that is operable for presenting the user interface information on a display device, said computer program product comprising:
- computer usable program code for invoking the machine executable code in a mode that renders user interface information contained within the machine executable code to form invoked machine executable code;
- computer usable program code, responsive to the computer usable program code for invoking the machine executable code, for determining which pre-existing modules within the invoked machine executable code are usable for rendering the user interface information on a display of a device;
- computer usable program code for using the pre-existing modules to render at least one user interface on the display of the device;
- computer usable program code for extracting the user interface information from the invoked machine executable code that is operable for presenting the user interface information on the display device by capturing an image of the at least one user interface rendered on the display during the invoking of the machine executable code; and
- computer usable program code for saving the captured image of the display of the at least one user interface rendered on the display to a file;
- wherein the computer usable program code for using the pre-existing modules to render at least one user interface further comprises:
- computer usable program code for invoking a given display module of the display modules that is on the list to render the at least one user interface.

* * * * *